UNITED STATES PATENT OFFICE.

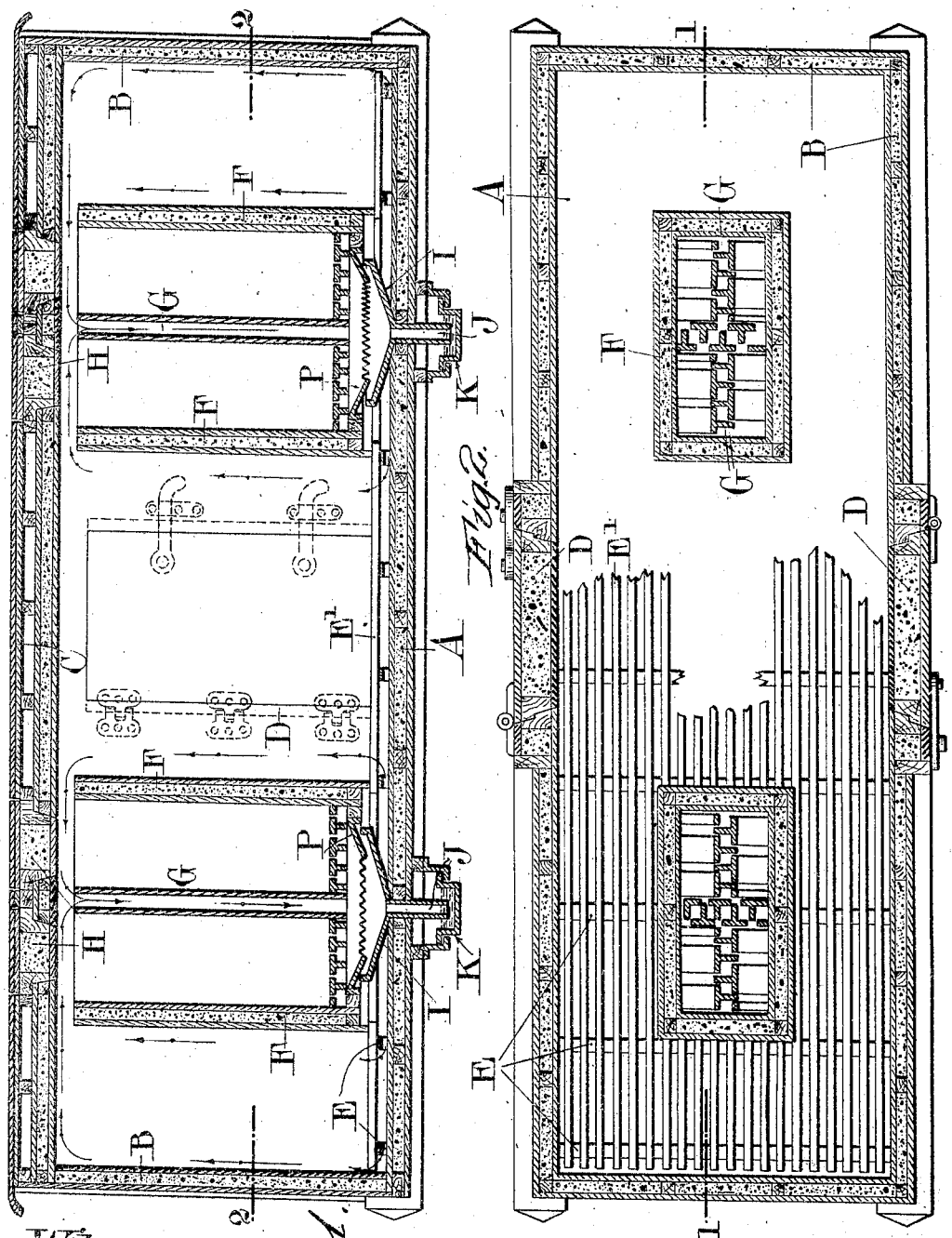

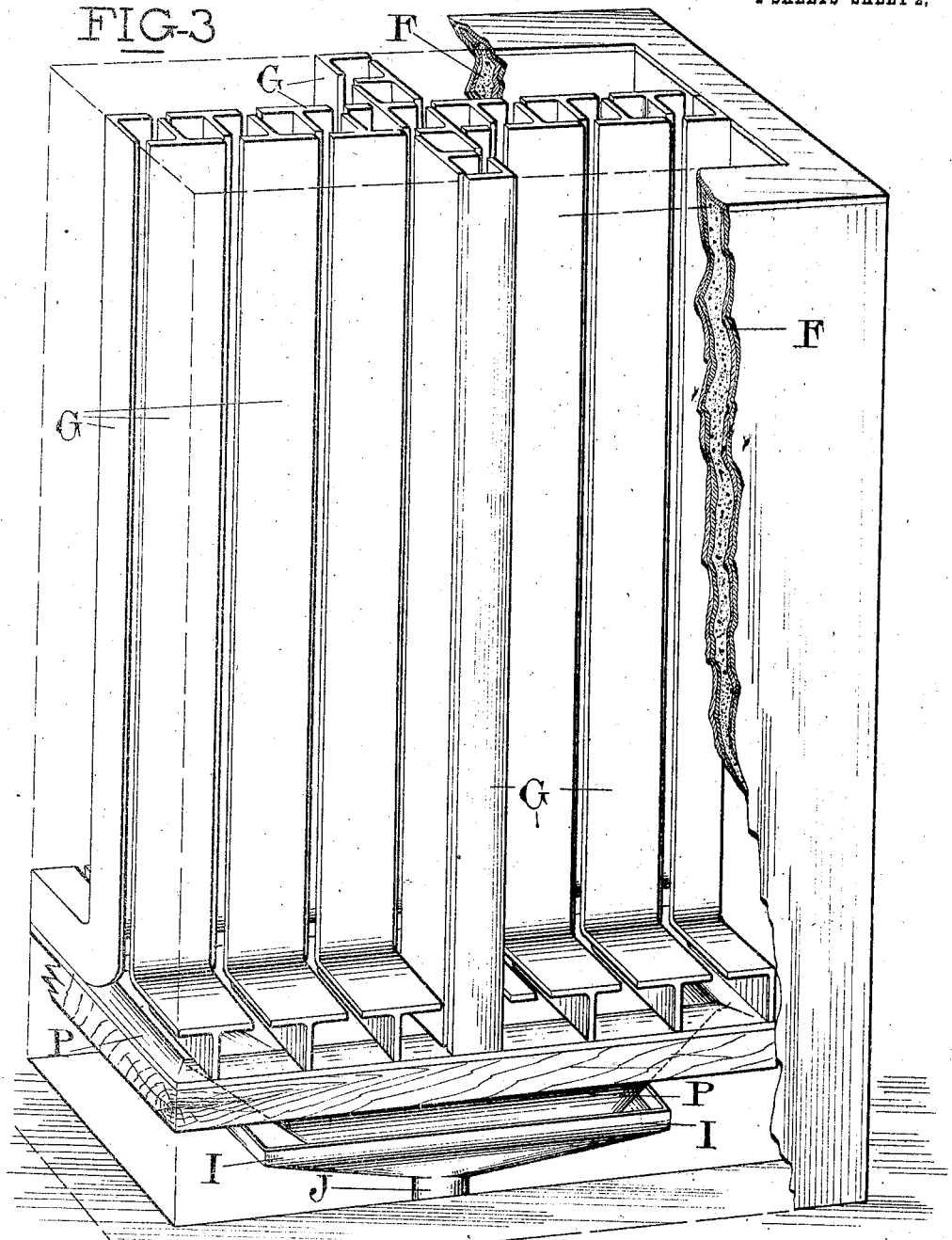

PIERRE FLEURY, OF PARIS, FRANCE.

REFRIGERATOR.

1,091,321.  Specification of Letters Patent.  Patented Mar. 24, 1914.

Application filed March 19, 1910. Serial No. 550,408.

*To all whom it may concern:*

Be it known that I, PIERRE FLEURY, a citizen of the French Republic, residing at Paris, in France, have invented a certain new and useful Improvement in Refrigerators, of which the following is a specification.

The present invention relates to a novel apparatus for preserving perishable substances during transit in cars, ships or in warehouses and the like, and the object is to effect such preservation by simple refrigeration in a dry atmosphere and without depriving the articles of their water constituents.

The condition of dryness around the substance to be preserved not only arrests the development of external germs, but has further the effect of contracting the skin in the case of fruit or a section of bruised meat, and can in certain cases form a preservative pellicle which prevents the bruised portions from spreading and contaminating adjacent parts. On the other hand, it is necessary, in order to keep the substances in a fresh condition, to preserve their water constituents and for this purpose two conditions are necessary, viz., a hygrometrical state below 0.95 which contracts the skin and renders it impermeable, and a low temperature. Another condition indispensable for effective preservation is a continuous replacement of air surrounding the substance which air by the fact of its contact with said substance has a tendency to become saturated. This air, which has a tendency toward the point of saturation, must not undergo any cooling during its passage across the substances, but on the contrary it is necessary that it undergoes a slight, constant heating so that as it progresses across the substances and approaches the point of saturation, this point has a tendency to rise. This result is obtained when the whole mass of the air is in constant and automatic vertical ascending movement, each successive and isotherm horizontal layer presenting a slight increase in temperature.

The movement, produced by a violent propulsion, a horizontal movement of the air across the substances, and arresting of the circulation, produce saturation of the air and consequently condensation occurs which softens the wrappers containing the substances and permits the ferments and germs to develop.

The object of the present invention is to remove these serious disadvantages.

An embodiment of the invention is shown in the annexed drawings which represent its application to a railroad car.

Figure 1 is a vertical section of a car and its interior arrangement on the line 1—1 of Fig. 2, and Fig. 2 is a horizontal section on the line 2—2 of Fig. 1. Fig. 3 is a perspective view of part of the apparatus on a larger scale.

The floor A, the side walls B, the roof C and the doors D of the car are formed of heat insulating material and preferably comprise double walls having interposed insulating substances such as cork, paper, felt and the like.

On the floor A are located cross-pieces E on which rest laths $E^1$ to insure the circulation of air from below upward around the articles to be preserved, which are placed on bases of wood or other material in packages sufficiently distanced from each other so that the air can surround and circulate about them. Pieces of meat are preferably suspended on hooks.

A convenient number of refrigerating apparatuses is placed inside the car, conveniently spaced in order to insure a general movement of the air and whereby the air is maintained at a suitable temperature. Each refrigerating apparatus extends from the level of the laths $E^1$ nearly to the roof of the car.

Each refrigerating apparatus comprises a casing F having double walls inclosing insulating material similar to that used in the manufacture of the walls of the car, the insulating effect being preferably increased by a sheet of thick felt, and within said casing are arranged vertical galvanized iron angle bars G of T or U section, grouped in such a manner as to form a plurality of air conduits. As will be seen from Fig. 2 of the drawing these conduits are disposed in groups lying midway along and across the chamber respectively, thus dividing the latter into compartments by separating walls, said walls each consisting of a row of vertically disposed bars and conduits. The lower ends of the T bars of one of said cross walls are bent horizontally outward from the cross wall and extend to the sides of the chamber so as to form a floor on which the ice rests and also to form continuations of the conduits. The horizontal webs of the T bars face outwardly and form the surface of the wall and also of the floor, thus presenting a substantially flat surface against which the ice rests. The bars and the ice are supported within the casings F which are sheathed with zinc or galvanized sheet iron. The sheathing is arranged to form gutters P which collect the water and conduct it into the funnel I. The ice is introduced through openings in the roof and closed by doors H. The funnel receives the water thawing off from the ice. The discharge pipe J from the funnel extends into a small vessel K made of sheet iron, which vessel when once filled forms a hydraulic seal.

The operation of this apparatus is as follows:—The air in the conduits formed by the bars G is cooled and naturally descends. The casings F do not extend up to the roof of the car and thus form with the space left at their lower portions a series of vessels communicating above and below with the interior of the car. The warmer air in the body of the car being unable to balance the cooled air columns of the same height in the casings, air passes from the body of the car into the upper part of the casings replaces the cooled air which flows out of the lower ends of the casings along the bottom of the car, spreads below the laths $E^1$ and becoming heated while in contact with the substances to be preserved, ascends around the articles. It is an essential feature of this invention that this movement of the air shall be automatic and due only to density differences caused by the heat derived from the substances to be preserved, and that there shall be no tendency to produce currents counter active to the desired direction of circulation. While discharging from the casings the air is saturated with water, but immediately its temperature is slightly increased its hygrometric condition is lowered. This slight and constant heating is not influenced by radiation nor contact with the exterior of the ice-containing casings F owing to the complete insulation of the walls of said casings, and the continued regular ascent, always corresponding to a slight increase of temperature, never permits this air to arrive at a point of saturation. Condensation is thus entirely confined to the interior of the casings and the cycle of circulation continues definitely and automatically. This continuous washing of the same air by condensation, renders it perfectly pure and aseptic. All odors and carbonic acid gas given off by the substances are absorbed by and carried off with the water of condensation.

By means of this apparatus the temperature of the substances, which is higher at the moment of their introduction, results in an increase of heat which accelerates the circulation of the air and produces an energetic drainage of the exterior moisture of the substances and renders them better adapted to resist the effects of oscillations and jolting of the car. The position of the cooling casings in the center of the car divides the substances to be preserved in an efficient manner.

It will be obvious that an indispensable condition in view of the entire substances being acted upon from the center is to divide or locate said substances in such a manner that each unit is under the influence of the preserving center.

In the apparatus described the external heat is an active element of the preservation, since this heat is the cause of the movement of the internal air with all of its resulting action.

In the event of transit of the substances having to be effected at a temperature below zero a gas burner disposed below the vessel K which receives the thaw-water, is sufficient to maintain the flow and to communicate by the conductibility of the funnel a slight heat, sufficient for the proper working of the apparatus as the charge itself and the insulation of the walls represents an important supplementary vehicle of heat.

It is obvious that the above described apparatus is applicable not only to cars, but also to ships, warehouses, and the like, only the form of the external walls being varied. As regards the internal installation which is the object of the present invention it remains substantially identical in all cases.

What I claim as my invention and desire to secure by Letters Patent of the United States is:—

1. In apparatus for preserving perishable substances, the combination with a closable chamber for said substances of a heat insulated casing in said chamber open at the top and bottom and comprising a plurality of bars of angular section grouped to form unimpeded air circulating conduits in said casing and spaced from the walls of the casing for reception of refrigerating matter between them and the walls.

2. In apparatus for preserving perishable substances, the combination with a closable chamber for said substances of a heat insulated casing open at the top and bottom, a series of bars of angular section located within said casing and grouped to form a plurality of unimpeded air circulation conduits and surrounding spaces for reception of refrigerating matter, said bars being bent horizontally at their lower ends for supporting the refrigerating matter exteriorly of the conduits.

3. In apparatus for preserving perishable substances, the combination with a closable chamber for said substances of a heat insulated casing open at the top and bottom, and a plurality of bars of angular section grouped to form two vertical hollow cross walls within said casing spaced from the walls of the casing and having their lower ends bent horizontally toward the walls of the casing.

4. In apparatus for preserving perishable substances, the combination with a closable chamber for said substances of a heat insulated casing open at the top and bottom, a series of bars of angular section located within said casing and grouped to form a plurality of unimpeded air circulation conduits and surrounding spaces for reception of refrigerating matter, said bars being bent horizontally at their lower ends for supporting the refrigerating matter exteriorly of the conduits, together with means for draining the condensed and drip water from the casing to the exterior of said chamber, and a hydraulic seal for said draining means.

In witness whereof I have signed this specification in the presence of two witnesses.

PIERRE FLEURY.

Witnesses:
    JEAN MARIE POYET,
    EDOUARD ANGLES.